United States Patent
Ueno et al.

(10) Patent No.: US 10,243,336 B2
(45) Date of Patent: Mar. 26, 2019

(54) ELECTRIC WIRE INSERTION MEMBER

(71) Applicants: Sumitomo Wiring Systems, Ltd, Yokkaichi, Mie (JP); TOYOTA JIDOSHA KABUSHIKI KAISHA, Toyota-shi, Aichi (JP)

(72) Inventors: Go Ueno, Mie (JP); Yasushi Atsumi, Mie (JP); Hiroshi Inoue, Mie (JP); Hiroki Kawakami, Toyota (JP)

(73) Assignees: SUMITOMO WIRING SYSTEMS, LTD., Yokkaichi-shi, Mie (JP); TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/549,902

(22) PCT Filed: Jan. 26, 2016

(86) PCT No.: PCT/JP2016/052089
§ 371 (c)(1),
(2) Date: Aug. 9, 2017

(87) PCT Pub. No.: WO2016/129382
PCT Pub. Date: Aug. 18, 2016

(65) Prior Publication Data
US 2018/0241185 A1 Aug. 23, 2018

(30) Foreign Application Priority Data
Feb. 12, 2015 (JP) .................................. 2015-025119

(51) Int. Cl.
*H02G 3/04* (2006.01)

(52) U.S. Cl.
CPC ............. *H02G 3/0418* (2013.01); *H02G 3/04* (2013.01); *H02G 3/0481* (2013.01)

(58) Field of Classification Search
USPC ....................................... 439/589; 174/110 SR
See application file for complete search history.

(56) References Cited

U.S. PATENT DOCUMENTS 2,987,691 A * 6/1961 Ross .................... H01R 13/625
439/294
3,317,658 A * 5/1967 Smith .................... H02G 15/18
174/138 F (Continued)

FOREIGN PATENT DOCUMENTS

JP      H09214150 A    8/1997
JP      2006147272 A   6/2006

(Continued)

OTHER PUBLICATIONS

International Search Report for Application No. PCT/JP2016/052089 dated Mar. 29, 2016, 4 pages.

(Continued)

*Primary Examiner* — William H. Mayo, III
*Assistant Examiner* — Krystal Robinson
(74) *Attorney, Agent, or Firm* — Reising Ethington, P.C.

(57) ABSTRACT

An electric wire insertion member includes an axially elongated cutout, a circumferentially elongated cutout, a turnable fitting, a locking projection, and an elastic locking piece. The axially elongated cutout extends frontward from a rear end of the shield pipe. The circumferentially elongated cutout extends from the axially elongated cutout in a circumferential direction. The turnable fitting is configured to be fitted in the shield pipe and to turn in a circumferential direction. The locking projection protrudes from the turnable fitting and configured to enter the axially elongated cutout as the turnable fitting is fitted into the shield pipe and to enter the circumferentially elongated cutout as the turnable fitting turns. The elastic locking piece is configured to be locked in a circumferential direction by a locked surface (Continued)

of the axially elongated cutout when the locking projection is positioned in the circumferentially elongated cutout.

8 Claims, 10 Drawing Sheets

(56) References Cited

U.S. PATENT DOCUMENTS

| | | | | |
|---|---|---|---|---|
| 3,902,785 | A * | 9/1975 | Matthews | G02B 6/3834 385/59 |
| 4,088,390 | A * | 5/1978 | McCartney | G02B 6/383 385/134 |
| 4,099,820 | A * | 7/1978 | DeLano | H01R 33/46 439/336 |
| 4,140,367 | A * | 2/1979 | Makuch | G02B 6/406 385/59 |
| 4,180,302 | A * | 12/1979 | Gordon | G01R 31/006 324/503 |
| 4,304,455 | A * | 12/1981 | McLaughlin | H01R 13/52 439/469 |
| 4,318,580 | A * | 3/1982 | Fleisher | H01R 4/2429 439/403 |
| 4,335,932 | A * | 6/1982 | Herrmann, Jr. | B29C 33/0016 174/541 |
| 4,563,051 | A * | 1/1986 | Slachetka | H01R 12/596 439/585 |
| 4,601,530 | A * | 7/1986 | Coldren | H01R 24/62 439/460 |
| D285,195 | S * | 8/1986 | Rubel | D13/144 |
| 4,636,024 | A * | 1/1987 | Yahata | H01R 13/595 439/449 |
| 4,662,692 | A * | 5/1987 | Uken | H01R 13/5216 439/271 |
| 4,688,833 | A * | 8/1987 | Todd | F16L 25/0045 285/12 |
| 4,767,355 | A * | 8/1988 | Phillipson | H01R 13/6599 439/425 |
| 4,800,648 | A * | 1/1989 | Nakayama | B60J 5/0413 174/72 A |
| 4,978,316 | A * | 12/1990 | Yahata | H01R 13/595 439/449 |
| 4,993,800 | A * | 2/1991 | Shibata | G02B 6/32 385/54 |
| 5,092,794 | A * | 3/1992 | Kachlic | H01R 13/6582 439/607.41 |
| 5,264,814 | A * | 11/1993 | Yamazaki | H01F 17/04 29/606 |
| 5,394,494 | A * | 2/1995 | Jennings | G02B 6/383 385/58 |
| 5,435,757 | A * | 7/1995 | Fedder | H01R 13/11 439/686 |
| 5,460,530 | A * | 10/1995 | Toba | B60R 16/0207 174/72 A |
| 5,529,508 | A * | 6/1996 | Chiotis | H01R 13/5216 439/204 |
| 6,155,867 | A * | 12/2000 | Chou | H01R 13/73 439/320 |
| 6,364,692 | B1 * | 4/2002 | Okayasu | H01R 13/5219 439/204 |
| 6,547,452 | B1 * | 4/2003 | Chan | B29C 45/14065 385/134 |
| 6,758,694 | B2 * | 7/2004 | Liu | H01R 13/405 439/606 |
| 7,641,500 | B2 * | 1/2010 | Stoner | H01R 13/633 439/357 |
| 8,215,988 | B2 * | 7/2012 | Ooki | H01R 13/5208 439/599 |
| 8,241,062 | B2 | 8/2012 | Tsuruta | |
| 8,662,920 | B2 * | 3/2014 | Ishibashi | H01R 13/6592 439/564 |
| 8,836,590 | B2 * | 9/2014 | Marten | H01Q 1/3275 343/711 |
| 9,843,139 | B2 * | 12/2017 | Ohkubo | H01R 9/032 |
| 2002/0038716 | A1 * | 4/2002 | Pineda | G02B 6/504 174/68.3 |
| 2002/0052141 | A1 * | 5/2002 | Hattori | H01R 13/5205 439/587 |
| 2004/0033711 | A1 * | 2/2004 | Loveless | H01R 13/213 439/314 |
| 2006/0025006 | A1 * | 2/2006 | Powell | H01R 13/5812 439/449 |
| 2006/0032653 | A1 * | 2/2006 | Minoshima | H01R 13/5216 174/564 |
| 2007/0037436 | A1 * | 2/2007 | Iwahori | H01R 13/5205 439/422 |
| 2011/0256756 | A1 * | 10/2011 | Lu | H01B 7/0892 439/449 |
| 2012/0018196 | A1 * | 1/2012 | Lin | H05K 1/0253 174/254 |
| 2013/0137285 | A1 * | 5/2013 | Miura | H01R 12/81 439/271 |
| 2013/0330963 | A1 * | 12/2013 | Miura | H01R 12/777 439/492 |
| 2015/0236442 | A1 * | 8/2015 | Cho | H01R 4/023 439/271 |
| 2016/0307670 | A1 * | 10/2016 | Makino | H02G 3/22 |

FOREIGN PATENT DOCUMENTS

| | | |
|---|---|---|
| JP | 2011044354 A | 3/2011 |
| JP | 2012089300 A | 5/2012 |

OTHER PUBLICATIONS

Written Opinion of the International Search Authority for Application No. PCT/JP2016/052089, 2 pages.

* cited by examiner

ELECTRIC WIRE INSERTION MEMBER

CROSS REFERENCE TO RELATED APPLICATIONS

This application claims the priority of Japanese patent application JP2015-025119 filed on Feb. 12, 2015, the entire contents of which are incorporated herein.

TECHNICAL FIELD

The technology disclosed in this specification relates to an electric wire insertion member including an electric wire protecting member.

BACKGROUND ART

An electric wire protecting member including a retainer attached to a tubular metal member such as a pipe or a bracket through which an electric wire is passed in a front-back direction described in Japanese Unexamined Patent Application Publication No. 2012-89300 (Patent Document 1 below) has been known. The retainer is made of synthetic resin and has a substantially cylindrical shape so as to be fitted to the inside of a rear opening edge portion of the shielding bracket. With the retainer attached to the shielding bracket, the electric wire in the shielding bracket is less likely to contact an inner opening edge of the shielding bracket and thus the electric wire is less likely to be damaged.

The retainer has a locking projection, which is configured to fit into a locking hole extending through the rear end portion of the shielding bracket from the inner circumferential surface to the outer circumferential surface, on the outer circumferential surface. The retainer is elastically displaced to fit the locking projection into the locking hole, enabling the protecting member to be held and retained by the shielding bracket.

DISCLOSURE

If the shielding bracket or the like to which the retainer is attached is thin, the locking projection in the locking hole protrudes outward from the outer circumferential surface of the shielding bracket. A protector or a swaging ring may be fixed to the outer circumferential surface of the shielding bracket in that state or a tape may be wounded thereon. In such a case, the locking projection may be pushed out of the locking hole, and the retainer may come off the shielding bracket if the locking projection is pushed out of the locking hole.

This specification discloses a technology that prevents a protecting member such as a retainer from coming off a tubular member such as a shielding bracket.

The technology disclosed in this specification relates to an electric wire insertion member in which a protecting member made of synthetic resin is attached to an end of a metal tubular member having a tubular shape through which an electric wire is passed. The electric wire insertion member includes an axially elongated cutout opening through the tubular member between an inside and an outside and extending from an end of the tubular member in an axial direction of the tubular member, a circumferentially elongated cutout opening through the tubular member between the inside and the outside and extending from the axially elongated cutout in a circumferential direction about an axis of the tubular member, a turnable fitting included in the protecting member and fitted in the tubular member so as to be positioned between the electric wire and an opening edge portion of the tubular member, the turnable fitting being configured to turn in the circumferential direction in the tubular member about the axis of the tubular member, a first locking portion protruding from the turnable fitting, the first locking portion configured to enter the axially elongated cutout as the turnable fitting is fitted into the tubular member and configured to enter the circumferentially elongated cutout as the turnable fitting turns, and a second locking portion included in the protecting member and configured to be caught by an edge of the axially elongated cutout facing an edge thereof adjacent to the circumferentially elongated cutout when the first locking portion enters the circumferentially elongated cutout.

In the electric wire insertion member having such a configuration, turning of the turnable fitting of the protecting member, which has been fitted into the tubular member, allows the first locking portion to be locked by the edge of the circumferentially elongated cutout in the axial direction of the tubular member, preventing the protecting member from coming off the tubular member. Furthermore, when the first locking portion is positioned in the circumferentially elongated cutout, the second locking portion is locked by the edge of the axially elongated cutout in the circumferential direction, preventing the turnable fitting from turning in the circumferential direction in the tubular member. In other words, since the second locking portion prevents the turnable fitting from turning, the first locking portion is locked in the circumferentially elongated cutout, preventing the protecting member from coming off the tubular member. Furthermore, since the first locking portion enters the axially elongated cutout when the turnable fitting is fitted into the tubular member, the turnable fitting positioned at a predetermined position in the tubular member is fitted, making the attachment of the turnable fitting easy compared with a case in which the turnable fitting is positioned after the turnable fitting is fitted into the tubular member, for example.

The electric wire insertion member disclosed in this specification may have the following configurations.

The second locking portion may have a cantilever shape extending in the circumferential direction along the tubular member and may be elastically displaceable in a radial direction of the turnable fitting. The second locking portion may be positioned onto the tubular member when the turnable fitting is fitted into the tubular member, and the second locking portion may be elastically restored and caught by the edge of the axially elongated cutout when the first locking portion enters the circumferentially elongated cutout.

This configuration enables the elastic locking piece to be elastically displaced and positioned onto the tubular member as the turnable fitting is fitted into the tubular member. In other words, the protecting member is able to be attached to the tubular member only by fitting the turnable fitting to the tubular member and turning the turnable fitting. This makes the attachment of the protecting member easy compared with a case in which an elastic locking piece is separately elastically displaced after the turnable fitting is fitted into the tubular member, for example.

The second locking portion may have a tapered guide surface at a front edge in a fitting direction so as to be positioned onto the tubular member.

This configuration enables the elastic locking piece to be smoothly guided by the guide surface and positioned onto the tubular member and reduces the possibility that the elastic locking piece will be cut and damaged by the tubular member.

The protecting member may include a cover that is extended from a rear edge of the turnable fitting at a rear side in the fitting direction and folded on an outer side of the turnable fitting to cover an opening edge portion of the tubular member, and the second locking portion may be integrally formed with the cover.

Since the cover covers the outer peripheral edge of the opening edge portion of the tubular member, this configuration prevents not only the electric wire in the tubular member, but also another component from coming in contact with the outer peripheral portion of the tubular member and being damaged.

Furthermore, since the second locking portion is positioned on the outer side of the tubular member, this configuration prevents the second locking portion from being damaged by the electric wire pressed thereto compared with a case in which the second locking portion is positioned on the inner surface of the tubular member, for example.

A front end of the cover may include a protector locking portion having a reversed tapered shape tilted rearward in the fitting direction toward an inner side from an outer side, the protector locking portion being configured to catch a tubular protector on the end of the tubular member.

This configuration enables the protector to be attached to the end of the tubular member by allowing the protector to be caught by the protector locking portion of the protecting member attached to the tubular member. This prevents the electric wire insertion member from having a complex structure compared with a case in which a protector locking portion configured to catch the protector is separately provided on the tubular member.

Furthermore, the protector locking portion having a reverse tapered shape enables the protector to be firmly fixed to the protecting member compared with a protector locking portion having a non-reverse tapered shape, for example.

At least one of the turnable fitting and the cover may have a tapered pressing tilted surface configured to press the tubular member toward the first locking portion and allow the tubular member to be sandwiched between the first locking portion and the pressing tilted surface in the axial direction of the tubular member when the end of the tubular member is positioned on the pressing tilted surface.

This configuration reduces the possibility that the protecting member will rattle in the axial direction of the tubular member in the tubular member.

The technology disclosed in this specification reduces the possibility that the protecting member will come off.

MODE FOR CARRYING OUT THE INVENTION

An embodiment is described with reference to FIG. 1 to FIG. 10.

Figure 1:
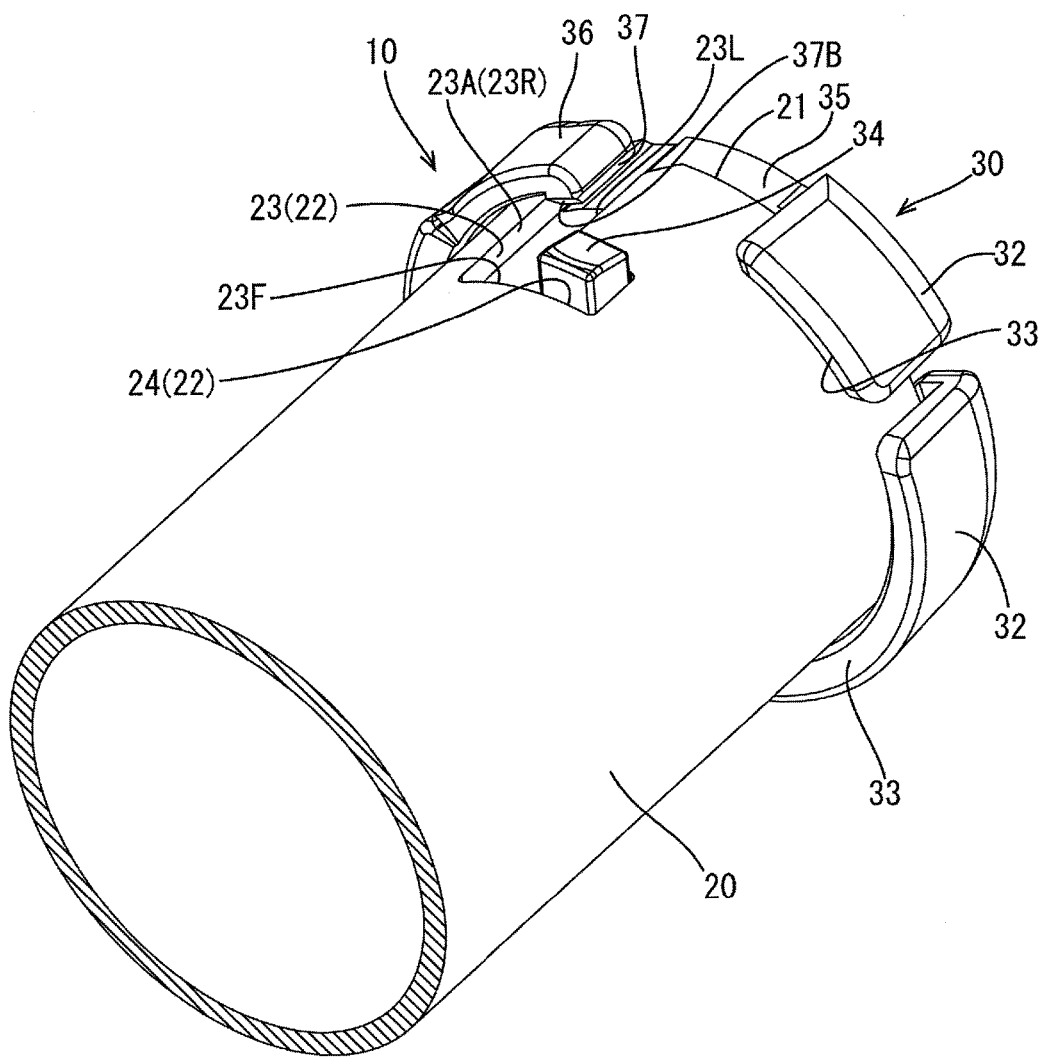
FIG. 1 is a perspective view of an electric wire insertion member.
Figure 3:
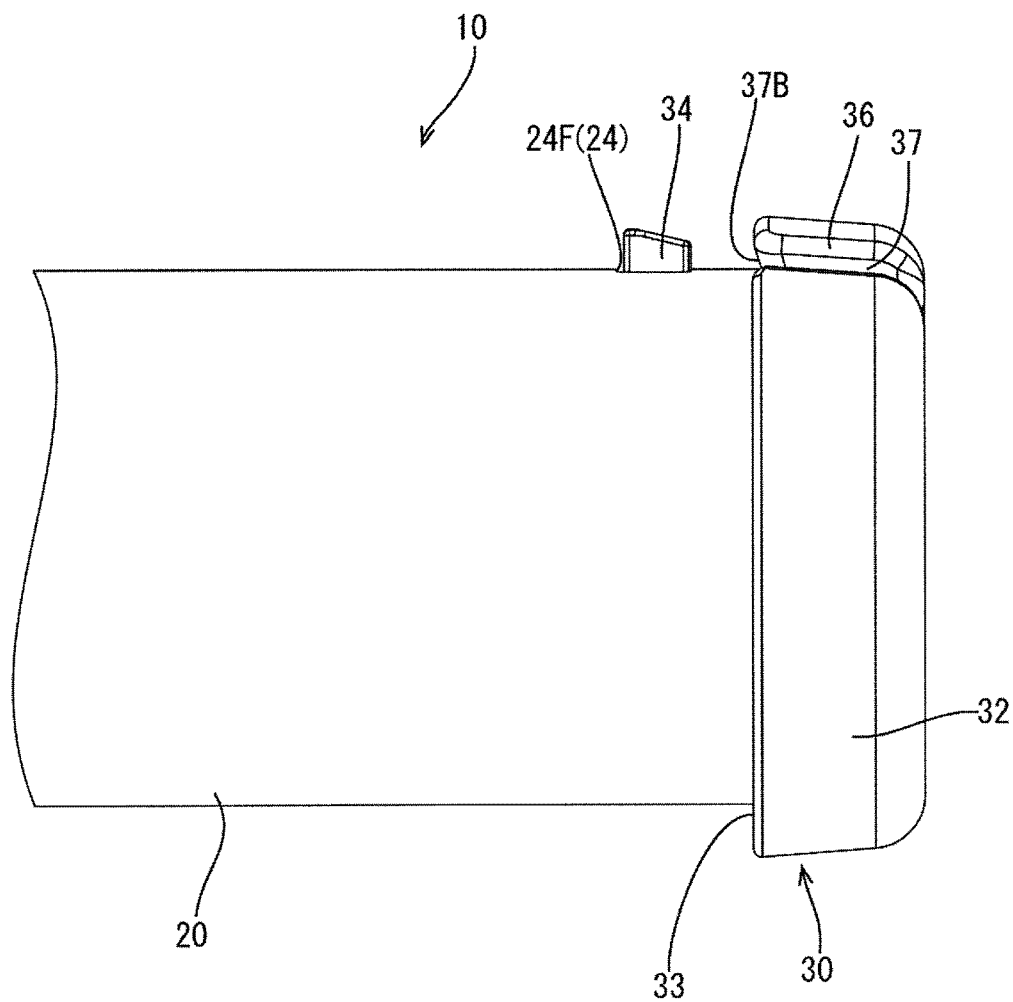
FIG. 3 is a side view of the electric wire insertion member.

In this embodiment, an electric wire insertion member 10 through which electric wires (not illustrated) routed in a vehicle are passed is described as an example. As illustrated in FIG. 1 and FIG. 3, the electric wire insertion member 10 includes a shielding pipe (one example of a "tubular member") 20 made of metal having high conductivity and a protecting member 30 made of a synthetic resin and attached to a rear end portion of the shielding pipe 20. In the following description, a vertical direction is based on the vertical direction in FIG. 4. A front-rear direction is based on FIG. 3, FIG. 7, and FIG. 9, and a left side therein is a front side and a right side therein is a rear side.

Figure 2:
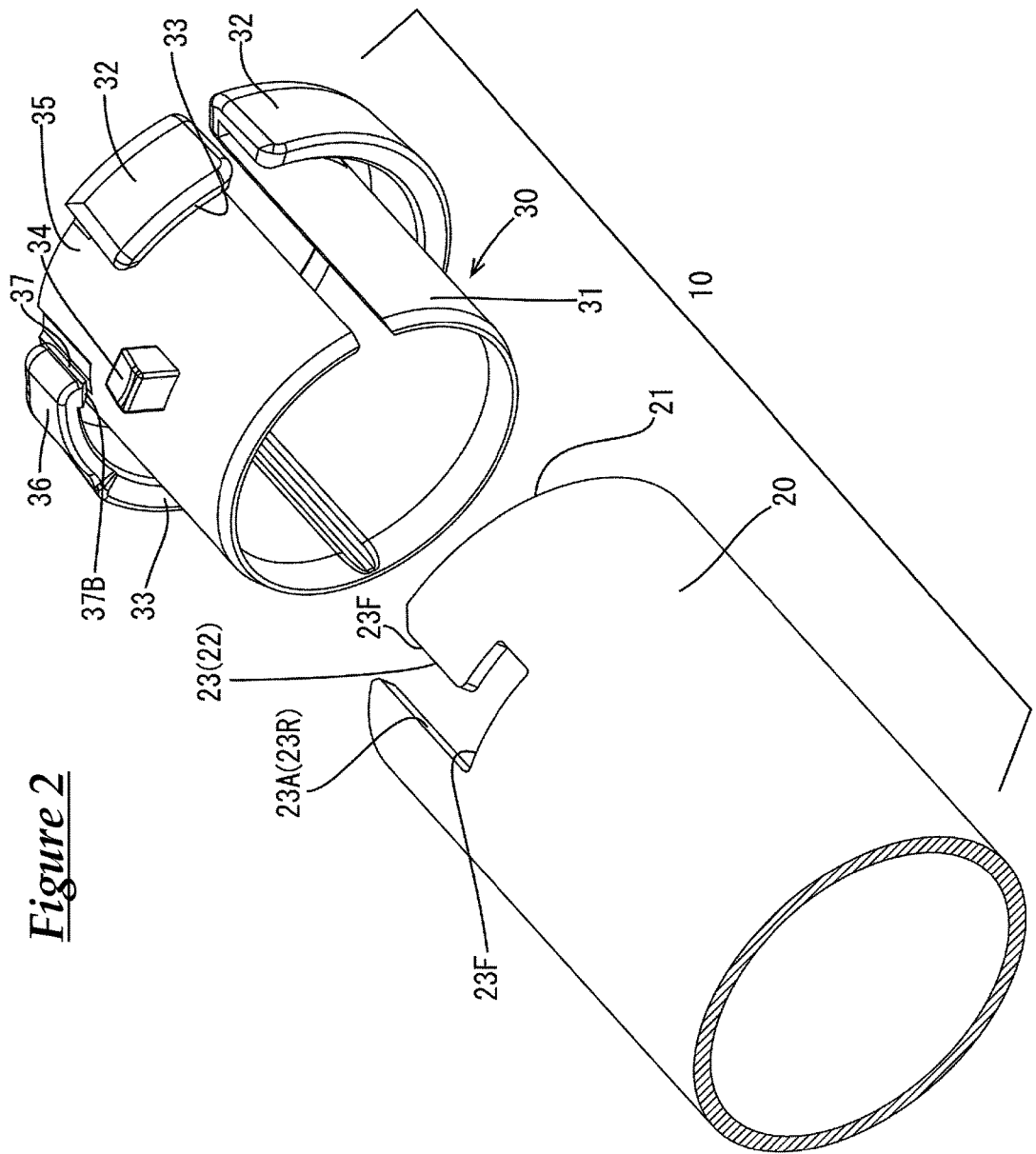
FIG. 2 is a perspective view illustrating a state before a protecting member is attached to a shielding pipe.

As illustrated in FIG. 1 to FIG. 3, the shielding pipe 20 is cylindrical and has an opening edge portion 21 at its end having a sharply pointed edge obtained by cutting the shielding pipe 20. The shielding pipe 20 has an inside allowing a plurality of electric wires, which are not illustrated, to pass therethrough. The shielding pipe 20 shields the electric wires therein and protects the electric wires from other components and water, for example. Furthermore, as illustrated in FIG. 3, the shielding pipe 20 has the rear end portion extending linearly in the front-rear direction, but the shielding pipe 20 as a whole is bent into a predetermined curved shape after the electric wires are passed through the shielding pipe 20.

As illustrated in FIG. 2 to FIG. 4 and FIG. 7, the protecting member 30 includes a turnable fitting 31 to be fitted into the shielding pipe 20 and a cover 32 covering the rear opening edge of the shielding pipe 20 from the outer side.

Figure 7:
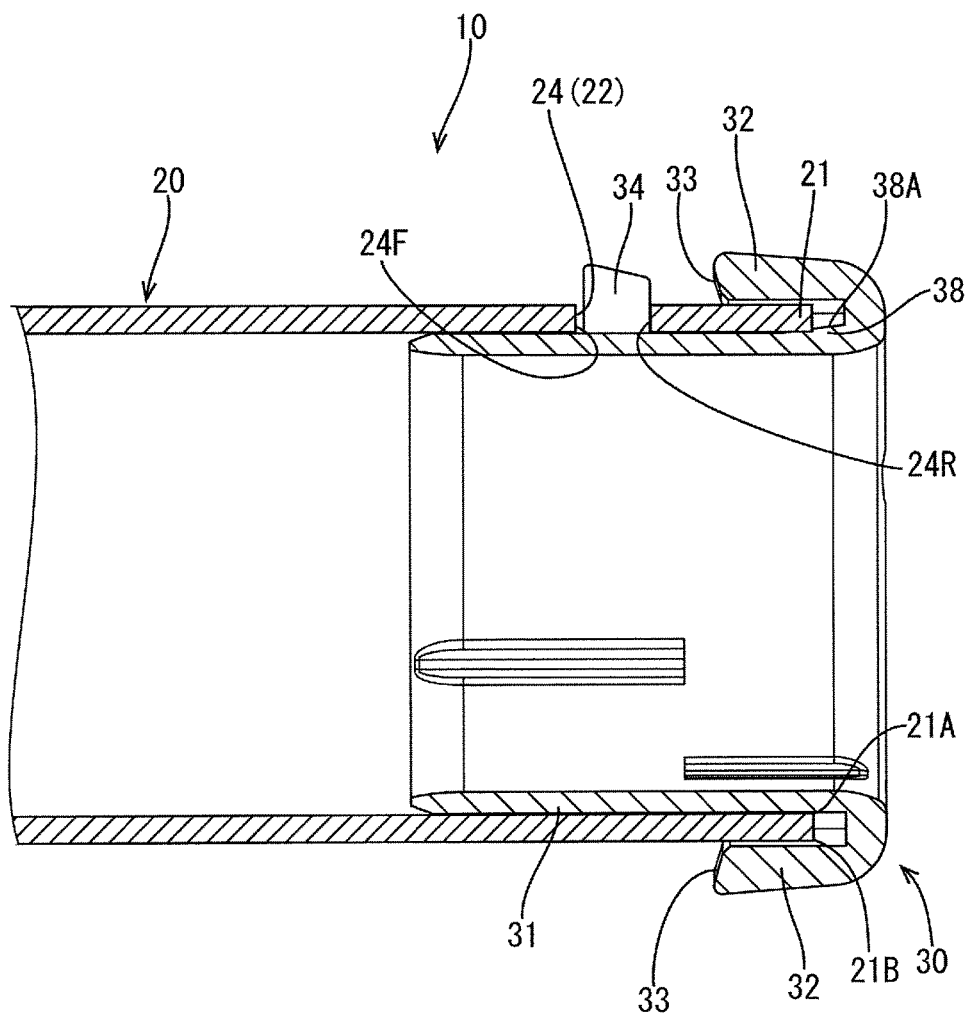
FIG. 7 is a vertical cross-sectional view illustrating a state before a turnable fitting fitted to the shielding pipe is turned.
Figure 9:
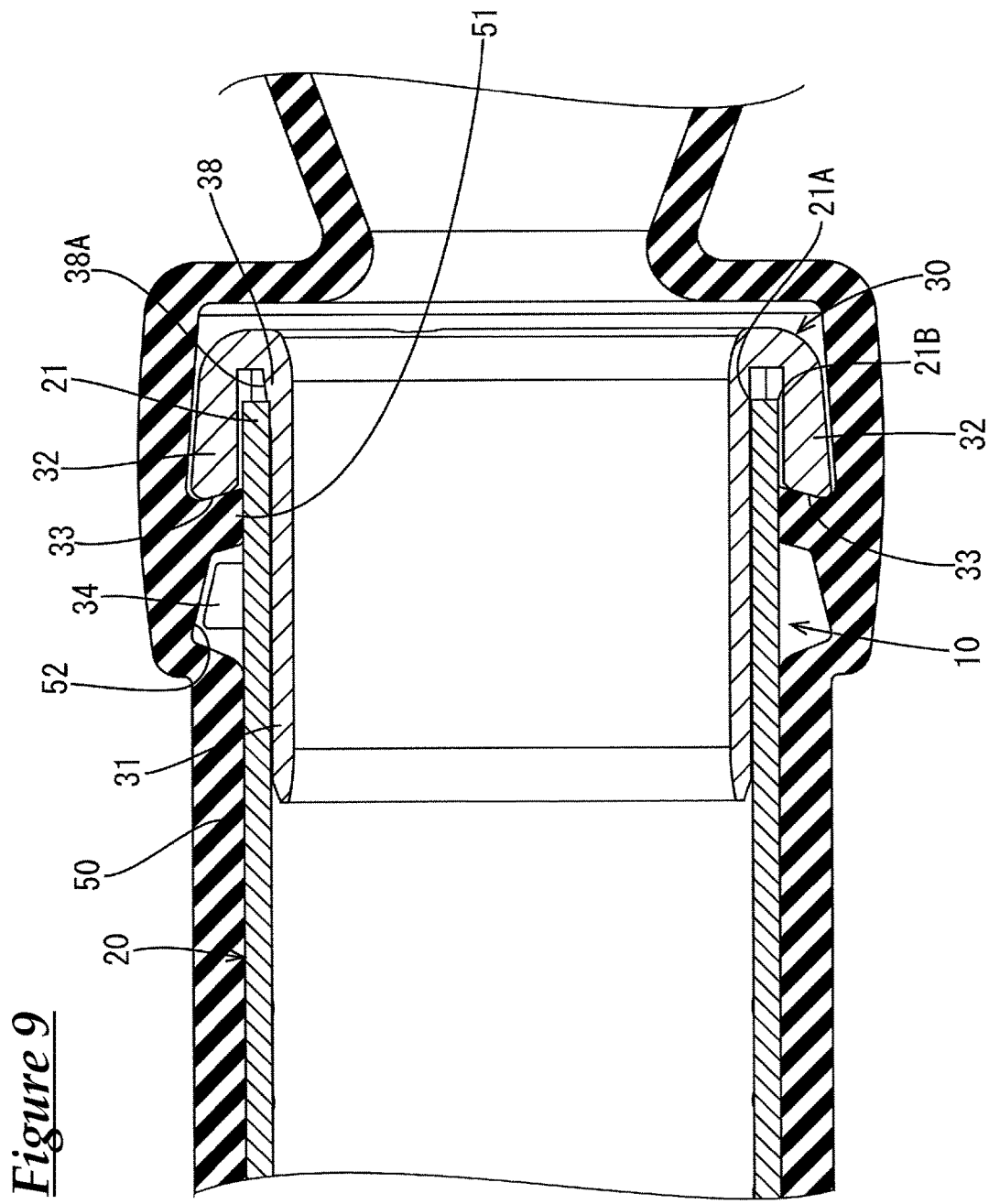
FIG. 9 is a vertical cross-sectional view illustrating a state in which a protector is attached to the electric wire insertion member.

As illustrated in FIG. 2, FIG. 7, and FIG. 9, the turnable fitting 31 has a cylindrical shape extending in the front-rear direction and is configured to be fitted into the rear end portion of the shielding pipe 20. Furthermore, the turnable fitting 31 is configured to turn in the circumferential direction in the shielding pipe 20.

The turnable fitting 31 has a lateral opening, which is a split extending in the front-rear direction (an axial direction in which the turnable fitting 31 extends) at the end of the peripheral wall. The electric wires are passed through the turnable fitting 31 through the lateral opening, enabling the electric wires to pass the turnable fitting 31 in the axial direction.

Figure 4:
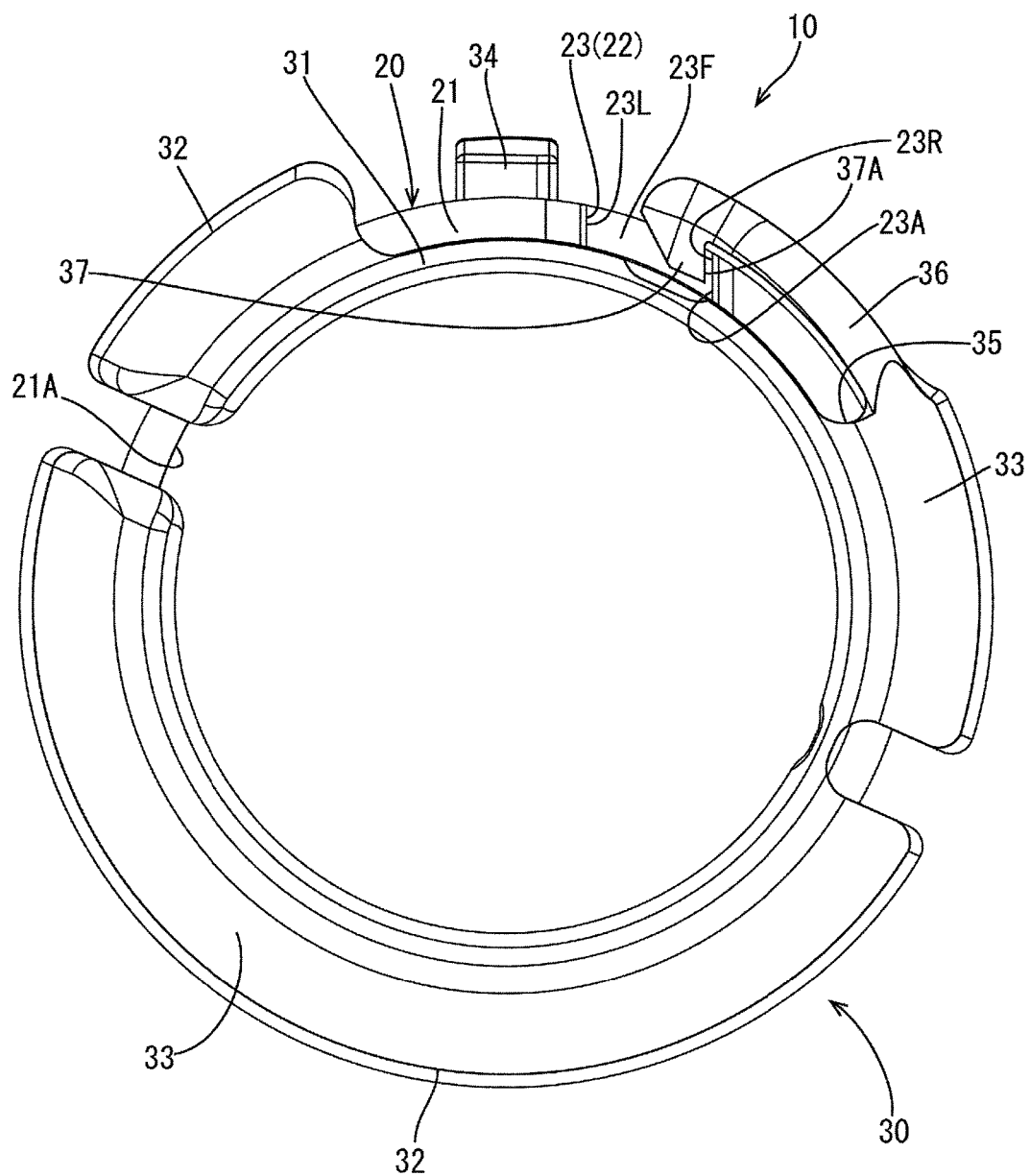
FIG. 4 is a rear view of the electric wire insertion member.

As illustrated in FIG. 2, FIG. 4, and FIG. 7, the cover 32 extends around the rear edge portion of the turnable fitting 31. The cover 32 is extended from the rear edge of the turnable fitting 31 in a radial direction of the turnable fitting 31 and folded on an outer side of the turnable fitting 31 toward the front by a small distance. As illustrated in FIG. 7, the cover 32 covers the rear opening edge portion 21 of the shielding pipe 20 when the turnable fitting 31 thereof is fitted into the shielding pipe 20 to a predetermined length. Thus, the protecting member 30 attached to the shielding pipe 20 prevents the electric wires in the shielding pipe 20 from coming in contact with the edge of the shielding pipe 20 and being damaged. As illustrated in FIG. 4, the cover 32 is separated at the position opposite of the axial center of the turnable fitting 31 from the lateral opening of the turnable fitting 31, and the turnable fitting 31 is slightly elastically deformed from the position where the cover 32 is separated, making an insertion operation of the electric wires through the lateral opening easy.

Figure 10:
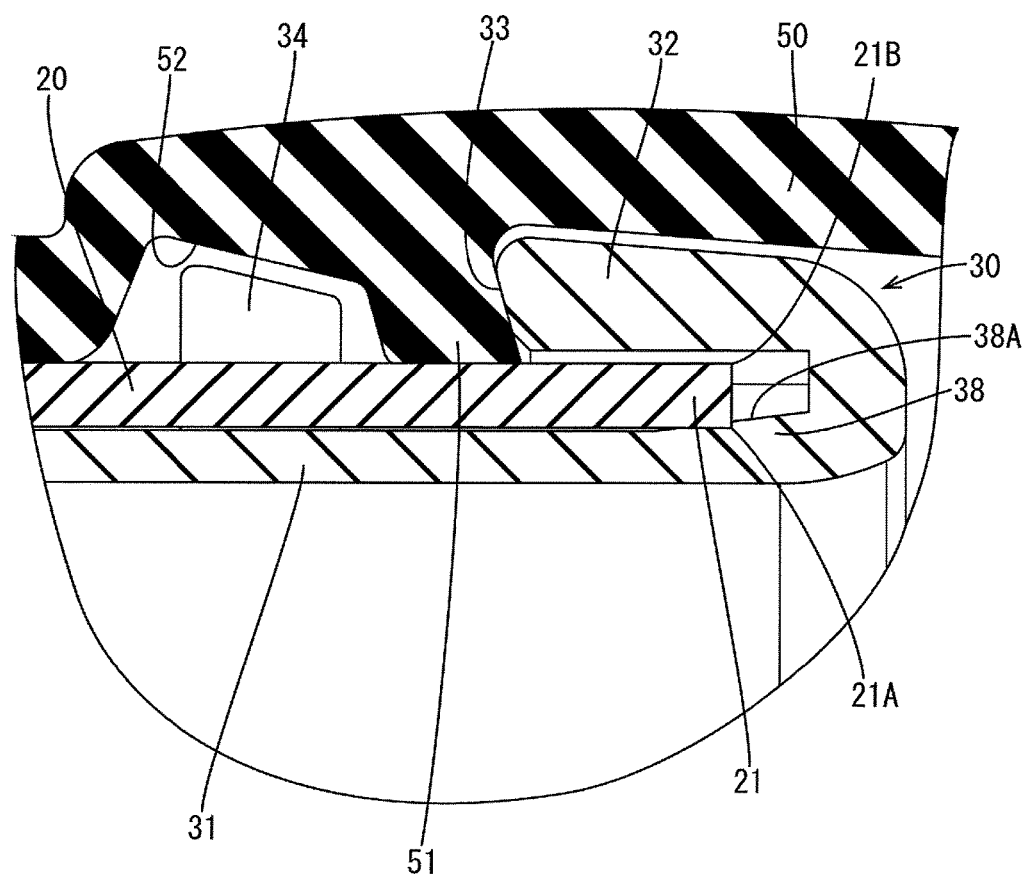
FIG. 10 is a magnified cross-sectional view of the main components in FIG. 9.

As illustrated in FIG. 9 and FIG. 10, the cover 32 includes a protector locking portion 33, which catches a protector 50 attached to the rear end portion of the electric wire insertion member 10, at a front end or a leading end.

The protector 50 is made of an elastic material such as rubber and has a substantially cylindrical shape collectively covering the rear end portion of the shielding pipe 20 and the protecting member 30. The protector 50 has a ring-shaped catch 51 on the inner circumferential surface thereof. The catch 51 is caught by the protector locking portion 33 from the front side, preventing the protector 50 from coming off the shielding pipe 20 in the rearward direction over the rear edge.

A relief groove 52 that has a shape recessed in the radially outward direction and accommodates a locking projection 34 of the protecting member 30, which is described later, is provided at the front of the catch 51 on the inner circumferential surface of the protector 50. This prevents the protector 50 from coming in contact with the locking projection 34 of the protecting member 30 when the protector 50 is attached to the rear end portion of the shielding pipe 20.

As illustrated in FIG. 9 and FIG. 10, the front surface of the protector locking portion 33 has a reverse tapered shape tilted rearward toward the inner side in the radial direction to readily catch the catch 51 of the protector 50. This enables the protector 50 to be held on the protecting member 30 with a great force, for example, compared with a front surface of a protector locking portion having a non-reverse tapered shape extending toward the outer side in the radial direction. Furthermore, this embodiment eliminates the need of providing a separate protector locking portion, which is configured to catch the protector 50, on the shielding pipe 20, for example, preventing the electric wire insertion member 10 from having a complex structure.

As illustrated in FIG. 1 and FIG. 2, the locking projection (one example of a "first locking portion") 34 protruding outward is disposed on an outer circumferential surface of the turnable fitting 31, and the rear end portion of the shielding pipe 20 has a cutout groove 22 to which the locking projection 34 enters when the turnable fitting 31 is fitted into the shielding pipe 20.

As illustrated in FIG. 2 and FIG. 7, the locking projection 34 is located at a substantially middle of the outer circumferential surface of the turnable fitting 31 in the front-rear direction and has a substantially quadrilateral block shape having four surfaces of front, rear, left, and right peripheral surfaces.

As illustrated in FIG. 2, the cutout groove 22 includes an axially elongated cutout 23 extending linearly from the rear opening edge portion 21 of the shielding pipe 20 toward the front and a circumferentially elongated cutout 24 extending in the counterclockwise direction about the axial center of the shielding pipe 20 from a left edge in rear view 23L of the front portion of the axially elongated cutout 23. The cutout groove 22 has an L-like shape as a whole.

Figure 5:
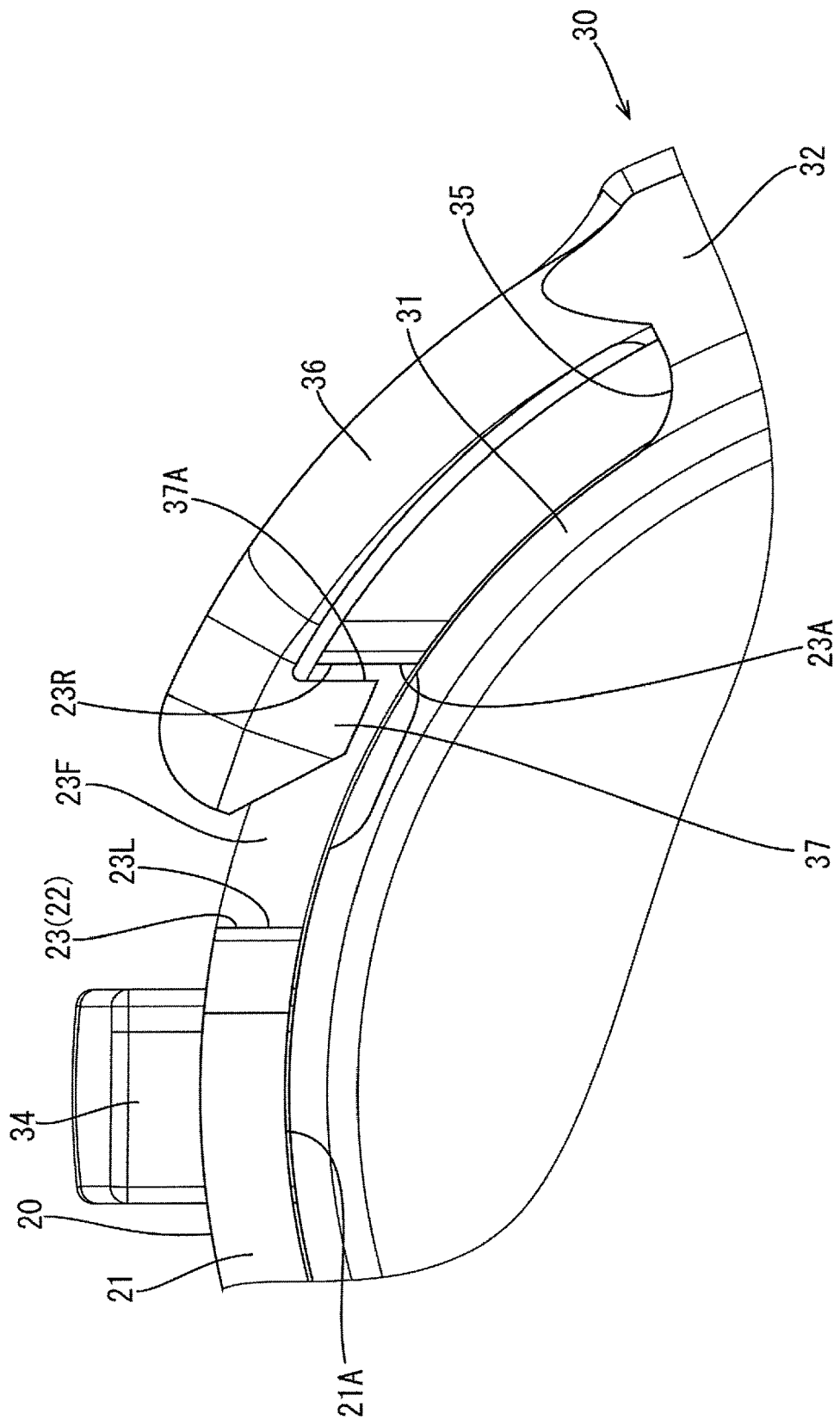
FIG. 5 is a magnified cross-sectional view of the main components in FIG. 4.
Figure 6:
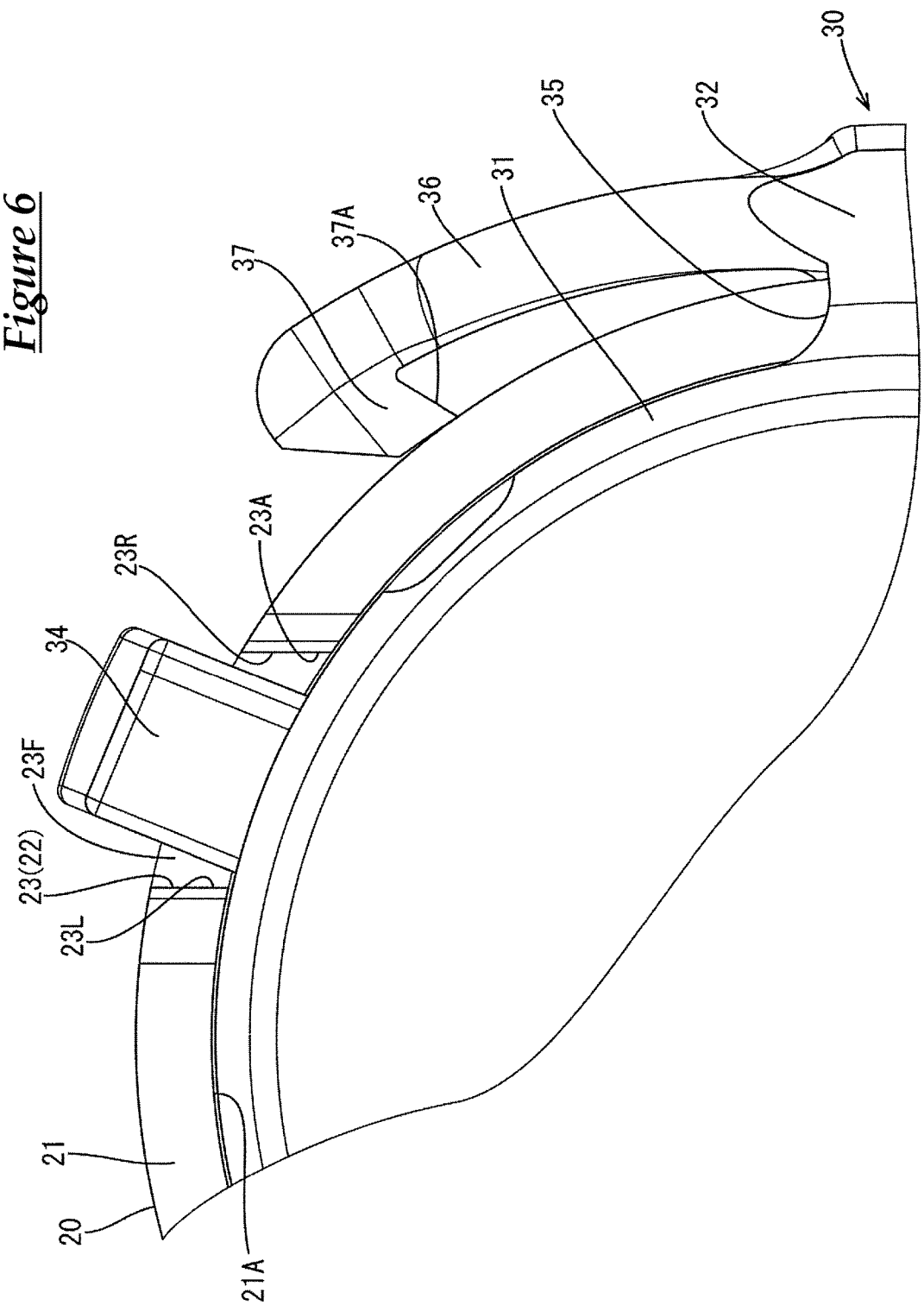
FIG. 6 is a magnified view corresponding to FIG. 5 and illustrates the main components before a turnable fitting fitted to the shielding pipe is turned.

As illustrated in FIG. 2, the axially elongated cutout 23 is a slit that opens through the shielding pipe 20 in an in-and-out direction. Furthermore, as illustrated in FIG. 4 to FIG. 6, in a state in which the circumferentially elongated cutout 24 is located at the upper side of the shielding pipe 20, the axially elongated cutout 23 extending through the shielding pipe 20 in the up-and-down direction is located at a right upper side in rear view. In other words, the lateral edge of the axially elongated cutout 23 is tilted with respect to the radial direction of the shielding pipe 20, and a right edge in rear view 23R has a locked surface 23A having an undercut shape tilted to the right in the circumferential direction toward the inner side in the radial direction.

As illustrated in FIG. 6, the width of the axially elongated cutout 23 in the circumferential direction is slightly larger than that of the locking projection 34 of the turnable fitting 31 in the left and right direction, and the locking projection 34 is allowed to enter the axially elongated cutout 23 when the turnable fitting 31 is fitted into the shielding pipe 20, resulting in the fitting of the turnable fitting 31 positioned in the circumferential direction relative to the shielding pipe 20. In addition, the axially elongated cutout 23 has such a length as to allow the locking projection 34 to come in contact with a front edge 23F of the axially elongated cutout 23 when the turnable fitting 31 is moved to a predetermined depth relative to the shielding pipe 20. The contact of the locking projection 34 with the front edge 23F of the axially elongated cutout 23 stops the forward fitting movement of the turnable fitting 31.

As illustrated in FIG. 2, the circumferentially elongated cutout 24 is a slit that opens through the shielding pipe 20 in the in-and-out direction similar to the axially elongated cutout 23. As illustrated in FIG. 7, the width of the circumferentially elongated cutout 24 in the front-back direction is slightly larger than that of the locking projection 34 of the turnable fitting 31 in the front-rear direction, and the length of the circumferentially elongated cutout 24 in the circumferential direction is substantially equal to the width of the locking projection 34 in the right-left direction.

The circumferentially elongated cutout 24 is configured such that the locking projection 34 positioned at the front end of the axially elongated cutout 23 enters thereinto when the turnable fitting 31 is turned in the counterclockwise direction in rear view. The innermost end of the circumferentially elongated cutout 24 is a final assembling position where the locking projection 34 is positioned when the attachment of the protecting member 30 is finished. Thus, as illustrated in FIG. 1, the locking projection 34 and a rear edge 24R of the circumferentially elongated cutout 24 are locked together in the front-rear direction when the locking projection 34 is positioned at the final assembling position of the circumferentially elongated cutout 24, preventing the protecting member 30 from coming off the shielding pipe 20.

Furthermore, as illustrated in FIG. 1, FIG. 2, and FIG. 4, the turnable fitting 31 has an exposed portion 35 on a rear side of the locking projection 34, which is not covered by the cover 32. The cover 32 on the right side of the exposed portion 35 in rear view integrally includes an elastic locking piece (one example of a "second locking portion") 36, which is locked in the circumferential direction by a locked surface 23A of the right edge in rear view 23R of the axially elongated cutout 23.

As illustrated in FIG. 4 to FIG. 6, the elastic locking piece 36 has a cantilever shape extending from the cover 32 in a counterclockwise direction, which is identical to an extending direction in which the circumferentially elongated cutout 24 extends, along the outer circumferential surface of the turnable fitting 31 and is elastically displaceable in a radially outward direction of the turnable fitting 31. In addition, the elastic locking piece 36 is located above the outer circumferential surface of the turnable fitting 31 in the radially outward direction by the distance substantially equal to the thickness of the shielding pipe 20. The elastic locking piece 36 has a locking nail 37 protruding in a radially inward direction at the tip. The right surface of the locking nail 37 in rear view is tilted to the right in the circumferential direction toward the inner side in the radial direction, and the surface is referred to as a locking surface 37A tilted at substantially the same angle as the locked surface 23A of the axially elongated cutout 23 in the shielding pipe 20.

As illustrated in FIG. 6, the elastic locking piece 36 is elastically displaced in the radially outward direction when the locking nail 37 is positioned onto the outer circumferential surface of the shielding pipe 20 over the rear opening edge in a step of attaching the protecting member 30 to the shielding pipe 20 from the rear side. Then, as illustrated in FIG. 4 and FIG. 5, when the turnable fitting 31 of the protecting member 30 is turned in the counterclockwise direction in rear view, the locking nail 37 is fitted into the axially elongated cutout 23, allowing the elastic locking piece 36 to be elastically restored. This allows the locking nail 37 and the locked surface 23A of the right edge in rear view 23R of the axially elongated cutout 23 (a side edge of the axially elongated cutout 23 facing an edge thereof adjacent to the circumferentially elongated cutout 24) to be locked together in the circumferential direction. The locking projection 34 is located at the final assembling position in the circumferentially elongated cutout 24 when the locking nail 37 of the elastic locking piece 36 and the locked surface 23A of the axially elongated cutout 23 are locked together.

In other words, the locking projection 34 is positioned in the circumferentially elongated cutout 24 as the turnable fitting 31 of the protecting member 30 is turned in the counterclockwise direction in rear view and reaches the final assembling position of the circumferentially elongated cutout 24. This is the end of the turning of the turnable fitting 31 in the counterclockwise direction in rear view. In addition, concurrently with this, the locking surface 37A of the locking nail 37 of the elastic locking piece 36 is locked in the circumferential direction by the locked surface 23A of the right edge in rear view 23R of the axially elongated cutout 23, stopping the turnable fitting 31 from turning in the counterclockwise direction in rear view. As illustrated in FIG. 1, this allows the locking projection 34 to be locked in the front-rear direction by a front edge 24F and the rear edge 24R of the circumferentially elongated cutout 24, preventing the protecting member 30 from coming off the shielding pipe 20.

Furthermore, as illustrated in FIG. 1, the locking nail 37 has a guide surface 37B at the front edge having a tapered shape tilted rearward toward the inner side in the radial direction. The guide surface 37B smoothly guides the elastic locking piece 36 when the locking nail 37 of the elastic locking piece 36 is positioned onto the outer circumferential surface of the shielding pipe 20 over the rear opening edge. In other words, the smooth guiding of the elastic locking piece 36 by the guide surface 37B enables the protecting member 30 to be smoothly attached to the shielding pipe 20 and reduces the possibility that the elastic locking piece 36 will be chipped and damaged by the rear opening edge portion 21 of the shielding pipe 20.

Figure 8:
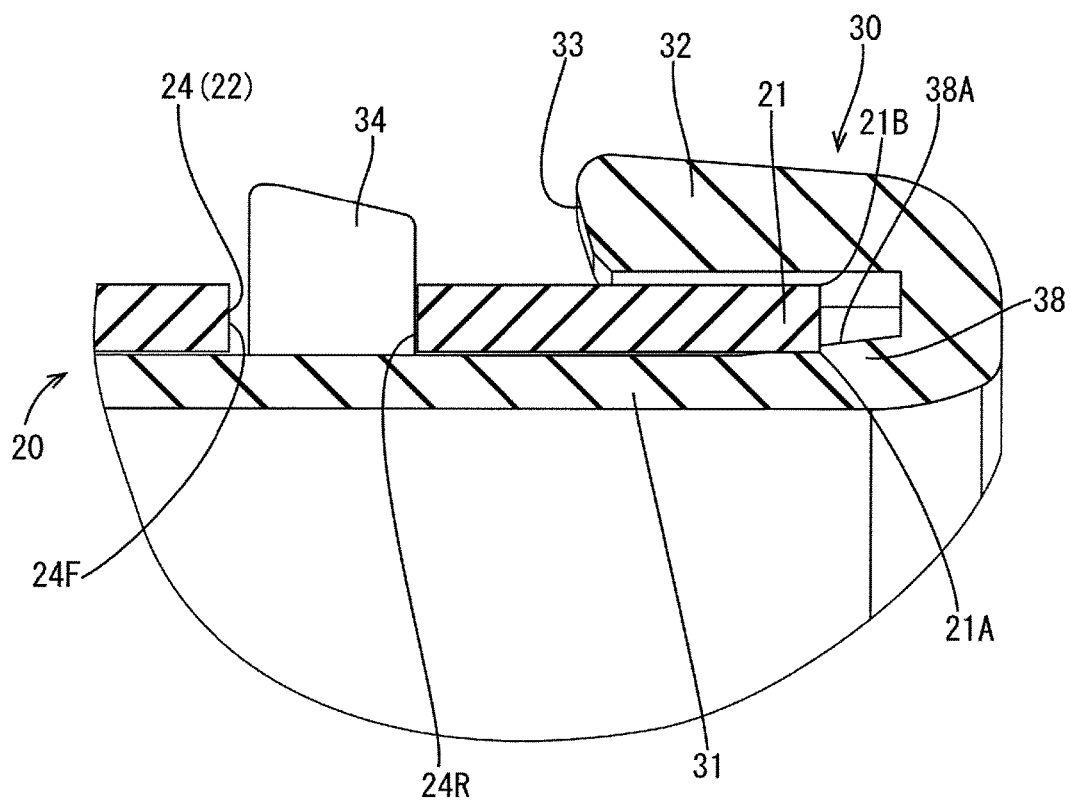
FIG. 8 is a magnified cross-sectional view of the main components in FIG. 7.

As illustrated in FIG. 7 to FIG. 10, a pressing portion 38, which presses an inner circumferential edge 21A of the rear opening edge portion 21 of the shielding pipe 20 in the frontward direction, protrudes from a rear end outer circumferential surface of the turnable fitting 31. The turnable fitting 31 includes a plurality of pressing portions 38 arranged in the circumferential direction with a predetermined distance therebetween. The front surface of the pressing portion 38 is a pressing tilted surface 38A protruding more in the radially outward direction toward the rear. As illustrated in FIG. 7 and FIG. 8, when the turnable fitting 31 is fitted to the shielding pipe 20, the inner circumferential edge 21A of the rear opening edge portion 21 of the shielding pipe 20 is positioned on the pressing tilted surface 38A, and the shielding pipe 20 is pressed by the pressing portion 38 in the frontward direction. In other words, the rear end portion of the shielding pipe 20 is sandwiched between the locking projection 34 and the pressing portion 38 from the front side and the rear side, fixing the protecting member 30 to the shielding pipe 20 so as not to rattle in the front-rear direction.

The present embodiment has the above-described configuration. Next, steps of assembling the electric wire insertion member 10 is described, and the operations and effects thereof are also described.

First, as illustrated in FIG. 2, the shielding pipe 20 and the protecting member 30 are provided, and then the protecting member 30 is attached to the rear end portion of the shielding pipe 20 such that the turnable fitting 31 of the protecting member 30 is fitted into the rear end of the shielding pipe 20.

In this attachment step, as illustrated in FIG. 6, the turnable fitting 31 is fitted into the shielding pipe 20 such that the locking projection 34 of the turnable fitting 31 is positioned in the axially elongated cutout 23 of the shielding pipe 20. This enables the turnable fitting 31 of the protecting member 30 positioned in the circumferential direction relative to the shielding pipe 20 to be fitted. Then, the turnable fitting 31 is moved relative to the shielding pipe 20 to a predetermined depth, allowing the locking projection 34 to come in contact with the front edge 23F of the axially elongated cutout 23. This stops the forward movement of the turnable fitting 31.

Furthermore, at the end of this fitting step, the guide surface 37B of the locking nail 37 of the elastic locking piece 36 is smoothly positioned onto the outer circumferential surface of the shielding pipe 20 over the rear opening edge portion 21, and the elastic locking piece 36 is elastically displaced in the radially outward direction. In other words, only the fitting of the turnable fitting 31 of the protecting member 30 into the rear end of the shielding pipe 20 enables the elastic locking piece 36 to be positioned on the outer circumferential surface of the shielding pipe 20 without being damaged by the rear opening edge portion 21 of the shielding pipe 20.

Then, the turnable fitting 31 is turned in the counterclockwise direction in rear view after the turnable fitting 31 is moved to the predetermined depth. Here, when the locking projection 34 is in the circumferentially elongated cutout 24 and the locking projection 34 is moved to the final assembling position of the circumferentially elongated cutout 24, as illustrated in FIG. 1, the locking projection 34 comes in contact with the innermost portion of the circumferentially elongated cutout 24, and the turnable fitting 31 is stopped from turning in the counterclockwise direction. Furthermore, as illustrated in FIG. 1, FIG. 4 and FIG. 5, when the locking projection 34 reaches the final assembling position, the locking nail 37 of the elastic locking piece 36 falls into the axially elongated cutout 23, resulting in that the elastic locking piece 36 is elastically restored and the locking surface 37A of the locking nail 37 is caught by the locked surface 23A of the right edge in rear view 23R of the axially elongated cutout 23 from the left side in the circumferential direction. This prevents the turnable fitting 31 from turning in the counterclockwise direction in rear view.

In other words, since the turnable fitting 31 is prevented from turning in the circumferential directions, the locking projection 34 is locked in the front-rear direction by the front-rear side edges of the circumferentially elongated cutout 24, reliably preventing the protecting member 30 from coming off the shielding pipe 20.

Furthermore, as illustrated in FIG. 7 to FIG. 10, when the protecting member 30 is attached to the shielding pipe 20, the pressing tilted surface 38A of the pressing portion 38 of the turnable fitting 31 presses the rear opening edge portion 21 of the shielding pipe 20 in the frontward direction. This allows the rear end portion of the shielding pipe 20 to be sandwiched between the locking projection 34 and the pressing portion 38 from the front side and the rear side, fixing the protecting member 30 to the shielding pipe 20 so as not to rattle in the front-rear direction. Thus, the electric wire insertion member 10 in which the protecting member 30 is attached to the shielding pipe 20 so as not to rattle in the front-rear direction is obtained.

Next, a predetermined number of electric wires are passed through the electric wire insertion member 10, and the shielding pipe 20 is subjected to a bending process to have a predetermined curved shape. Here, the rear opening edge portion 21 of the shielding pipe 20 has a sharp edge, but the turnable fitting 31 of the protecting member 30 is positioned between the inner circumferential edge 21A of the rear opening edge portion 21 of the shielding pipe 20 and the electric wires. In addition, since the cover 32 of the protecting member 30 covers an outer circumferential edge 21B of the rear opening edge portion 21 of the shielding pipe 20 from the outer side, another component or the like do not come in contact with and damage the shielding pipe 20.

The protector 50 is attached to the rear end portion of the electric wire insertion member 10 after the electric wires are passed through the electric wire insertion member. In FIG. 9 and FIG. 10, the electric wires are not illustrated. In the attachment step of the protector 50, as illustrated in FIG. 9 and FIG. 10, a catch 51 of the protector 50 is caught by the protector locking portion 33 of the turnable fitting 31 of the protecting member 30 from the front side such that the protector 50 is fixed to the electric wire insertion member 10.

Here, the front surface of the protector locking portion 33 has a revered tapered shape tilted rearward toward the inner side in the radial direction to readily catch the catch 51 of the protector 50 from the front side, enabling the protector 50 to be held on the protecting member 30 with a greater force. Furthermore, this eliminates the need of providing a separate protector locking portion configured to catch the protector 50 on the shielding pipe 20, preventing the electric wire insertion member 10 from having a complex structure.

Meanwhile, when the protector 50 is attached to the outer circumferential surface of the protecting member 30 of the electric wire insertion member 10 or a tape is wound around the outer surface of the electric wire insertion member 10, for example, the protector 50 or the tape may press the protecting member 30 from the outer side in the radial direction or an external force may be applied to the protecting member 30 in the circumferential direction. In such a case, the protecting member 30 may come off the shielding pipe 20.

However, in the present embodiment, the locking projection 34 is not displaced in the radially inward direction, and the elastic locking piece 36 is locked in the circumferential direction by the locked surface 23A of the axially elongated cutout 23 to prevent the turning of the turnable fitting 31. Thus, the locking projection 34 does not disengage from the circumferentially elongated cutout 24, and the protecting member 30 does not come off the shielding pipe 20.

As described above, the electric wire insertion member 10 according to the present embodiment not only prevents the electric wires in the shielding pipe 20 from being damaged by the turnable fitting 31, but also prevents the protecting member 30 from coming off the shielding pipe 20 even when the protector 50 is attached to or a tape is wound around the electric wire insertion member 10, since the locking projection 34 on the turnable fitting 31 is caught by the rear edge 24R of the circumferentially elongated cutout 24 from the front side and the turnable fitting 31 is locked by the elastic locking piece 36 so as not to turn.

Furthermore, in the attachment of the protector 50 to the electric wire insertion member 10, the catch 51 of the protector 50 is caught by the protector locking portion 33 of the protecting member 30, which is prevented from coming off the shielding pipe 20, from the front side. This prevents the electric wire insertion member 10 from having a complex structure compared with a case in which a separate protector locking portion configured to catch the protector is disposed on the shielding pipe, for example. Furthermore, the protector locking portion 33 having a reverse tapered shape enables the protector 50 to be held on the protecting member 30 with a great force compared with a protector locking portion having a non-reverse tapered shape, for example.

The present invention is not limited to the embodiment described above and illustrated by the drawings. For example, the following embodiments are included in the technical scope of the present invention.

In the above-described embodiment, the turnable fitting 31 has a cylindrical shape. However, the invention is not limited to this configuration, and the turnable fitting may have a square tubular shape.

In the above-described embodiment, the elastic locking piece 36 is disposed on the cover 32, and the elastic locking piece 36 is caught by the locked surface 23A of the axially elongated cutout 23 from the outer side of the shielding pipe 20. However, the invention is not limited to this configuration, and the elastic locking piece may be disposed on the turnable fitting and the elastic locking piece may be caught by the locked surface of the axially elongated cutout from the inner side of the shielding pipe.

In the above-described embodiment, the elastic locking piece 36 elastically deformable in the radially outward direction is caught by the locked surface 23A of the axially elongated cutout 23. However, the invention is not limited to this configuration, and a cover having a locking projection protruding in the radially inward direction may be provided such that the locking projection is caught by the locked surface of the axially elongated cutout.

The above-described embodiment includes the lateral opening through which the electric wire is passed through the turnable fitting 31. However, the invention is not limited to this configuration, and the turnable fitting may have no lateral opening and the electric wire may be introduced from the front end.

In the above-described embodiment, the locking projection 34 has a substantially quadrilateral block shape. However, the invention is not limited to this configuration, and the locking projection may have a cylindrical shape or a triangular prism shape.

In the above-described embodiment, the circumferentially elongated cutout 24 extends from the axially elongated cutout 23 in the counterclockwise direction in rear view, and the turnable fitting 31 moved into the predetermined depth is turned in the counterclockwise direction in rear view. However, the invention is not limited to this configuration. The circumferentially elongated cutout may extend from the axially elongated cutout in a clockwise direction in rear view, and the elastic locking piece may be locked in the circumferential direction by the left edge in rear view of the axially elongated cutout. The turnable fitting moved into a predetermined depth may be turned in the clockwise direction in rear view.

In the above-described embodiment, the electric wire insertion member 10 in which the protecting member 30 is attached to the shielding pipe 20 is described as an example.

However, the present invention is not limited to this configuration, and a technology disclosed in this specification may be applied to an electric wire insertion member in which a protecting member is attached to a tubular member such as a metal shielding bracket.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

EXPLANATION OF SYMBOLS 10 electric wire insertion member
20 shielding pipe (tubular member)
23 axially elongated cutout
24 circumferentially elongated cutout
30 protecting member
31 turnable fitting
32 cover
33 protector locking portion
34 locking projection (first locking portion)
36 elastic locking piece (second locking portion)
37A guide surface
38A pressing tilted surface
50 protector

The invention claimed is:

1. An electric wire insertion member including a protecting member made of synthetic resin and attached to an end of a metal tubular member having a tubular shape through which an electric wire is passed, the electric wire insertion member comprising:

an axially elongated cutout opening through the tubular member in an in-and-out direction and extending from an end of the tubular member in an axial direction of the tubular member;
a circumferentially elongated cutout opening through the tubular member in the in-and-out direction and extending from the axially elongated cutout in a circumferential direction about an axis of the tubular member;
a turnable fitting included in the protecting member and fitted in the tubular member so as to be positioned between the electric wire and an opening edge portion of the tubular member, the turnable fitting being configured to turn in the circumferential direction in the tubular member about the axis of the tubular member when the turnable fitting is fitted in the tubular member and positioned between the electrical wire and the opening edge portion of the tubular member;
a first locking portion protruding from the turnable fitting, the first locking portion configured to enter the axially elongated cutout as the turnable fitting is fitted into the tubular member and configured to enter the circumferentially elongated cutout as the turnable fitting turns; and
a second locking portion included in the protecting member and configured to be caught by an edge of the axially elongated cutout facing an edge thereof adjacent to the circumferentially elongated cutout when the first locking portion enters the circumferentially elongated cutout.

2. The electric wire insertion member according to claim 1, wherein the second locking portion has a cantilever shape extending in the circumferential direction along the tubular member and is elastically displaceable in a radial direction of the turnable fitting, and
the second locking portion is positioned onto the tubular member when the turnable fitting is fitted into the tubular member, and the second locking portion is elastically restored and caught by the edge of the axially elongated cutout when the first locking portion in the circumferentially elongated cutout.

3. The electric wire insertion member according to claim 2, wherein the second locking portion has a tapered guide surface at a front edge thereof in a fitting direction so as to be positioned onto the tubular member.

4. The electric wire insertion member according to claim 3, wherein the protecting member includes a cover that is extended from a rear edge of the turnable fitting at a rear side in a fitting direction and folded on an outer side of the turnable fitting to cover the opening edge portion of the tubular member, and
the second locking portion is integrally formed with the cover.

5. The electric wire insertion member according to claim 2, wherein the protecting member includes a cover that is extended from a rear edge of the turnable fitting at a rear side in a fitting direction and folded on an outer side of the turnable fitting to cover the opening edge portion of the tubular member, and
the second locking portion is integrally formed with the cover.

6. The electric wire insertion member according to claim 5, wherein a front end of the cover includes a protector locking portion having a reversed tapered shape tilted rearward in the fitting direction toward an inner side from an outer side, the protector locking portion configure to catch a tubular protector on the end of the tubular member.

7. The electric wire insertion member according to claim 6, wherein at least one of the turnable fitting and the cover has a tapered pressing tilted surface configured to press the tubular member toward the first locking portion and allow the tubular member to be sandwiched between the first locking portion and the pressing tilted surface in the axial direction of the tubular member when the end of the tubular member is positioned on the pressing tilted surface.

8. The electric wire insertion member according to claim 5, wherein at least one of the turnable fitting and the cover has a tapered pressing tilted surface configured to press the tubular member toward the first locking portion and allow the tubular member to be sandwiched between the first locking portion and the pressing tilted surface in the axial direction of the tubular member when the end of the tubular member is positioned on the pressing tilted surface.

* * * * *